Dec. 25, 1934.  C. B. GILMORE  1,985,319
CONTROL MECHANISM
Filed Dec. 3, 1927  2 Sheets-Sheet 1

Inventor:
Charles B Gilmore
By Jones, Addington, Ames & Seibold
Attys.

Inventor:
Charles B. Gilmore.
By Jones, Addington, Ames & Seibold.
Att'ys.

Patented Dec. 25, 1934

1,985,319

UNITED STATES PATENT OFFICE 1,985,319

CONTROL MECHANISM

Charles B. Gilmore, Chicago, Ill.

Application December 3, 1927, Serial No. 237,428

14 Claims. (Cl. 192—.01)

My invention relates to control mechanism for automobiles and more particularly to control mechanism for the brake mechanism and clutch mechanism.

One of the objects of my invention is to provide means whereby the driver may, if he desires, cause the brake to be held applied automatically, thereby relieving the driver of the necessity for holding his foot on the brake pedal after the vehicle is stopped. This is often desirable; one situation where it is desirable being in the event the driver has to stop on a grade.

A further object of my invention is to provide means whereby the clutch mechanism may when desired be held in disconnecting position automatically so that the gear shift need not be moved to neutral position. This also is desirable in various situations, one of them being that mentioned above where it may be desired to hold the car on a grade. By the use of both of the above features, it will be seen that it will not be necessary for the driver either to maintain foot pressure on the brake pedal or to maintain foot pressure on the clutch pedal, as these are both automatically taken care of when desired under the present arrangement.

A further object of my invention is to provide means whereby the brakes will be released and the clutch allowed to engage automatically upon the accelerating movement of the accelerator means. By this construction, it will be seen that the car may be held on an incline without any effort on the part of the driver, but that as soon as the driver presses on the accelerator, the brakes will be released, the clutch engaged and the engine accelerated by the one simple operation of pressing down on the accelerator button.

A further object of my invention is to so design the brake controlling mechanism and clutch control mechanism that they will automatically become ineffective when the car is in motion and traveling under its own power.

A further object of my invention is to provide means whereby the automatic brake and clutch controlling means may be rendered inoperative when desired, at the will of the driver, so that the car is controlled in exactly the same manner in which it would be controlled if my improved brake and clutch controlling means were not present.

A further object of my invention is to provide a construction in which the brake may be held applied without any effort on the part of the driver when driving in traffic, but in which the brake is released automatically in the ordinary operation of starting up again.

A further object of my invention is to provide a construction in which the clutch may be held in disconnecting position without any effort on the part of the driver but in which the clutch is automatically released to move into connecting position when the driver operates the accelerator preparatory to starting the car.

A further object of my invention is to provide a construction in which the clutch pedal is held in disconnected position without any effort on the part of the driver when desired, and which requires manual operation to release the clutch pedal to permit it to move to connecting position.

Further objects will appear from the description and claims.

In the drawings, in which an embodiment of my invention is shown,

Figure 1:
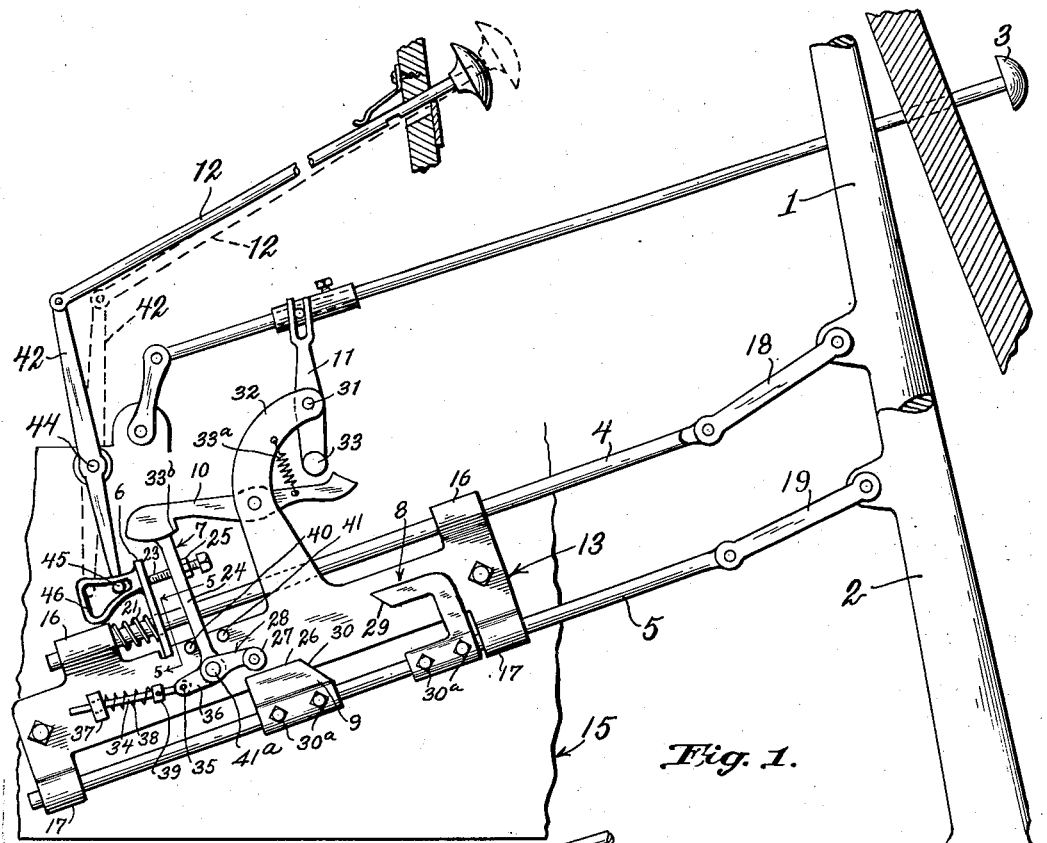
Figure 1 is a side elevation showing my improvement applied to an automobile, the brake pedal being in normal brake released position, and the clutch pedal being in clutch connecting position.

Referring to the drawings in detail, the construction shown therein comprises a brake pedal 1 normally held by a spring (not shown) in non-braking position, a clutch pedal 2 normally held by a spring (not shown) in clutch engaging position, an accelerator button 3 normally held in low speed position, a brake holding slide 4 connected with the brake pedal 1, a cam carrying and clutch holding slide 5 connected with the clutch pedal, a latch or gripping member 6 cooperating with the brake holding slide 4, a bell-crank restraining lever 7 which normally holds the gripping member 6 in inoperative position, a pair of cams 8 and 9 on the cam-carrying slide 5 for controlling the latch controlling bell-crank lever, a pivoted latch 10 for engaging the latch controlling lever, and a lever 11 controlled by the accelerator button 3 for controlling the latch. The construction also comprises a pull rod 12 operable by the driver which has an operative relation with the latch 6 for the brake-holding slide so that when desired the driver can prevent this latch from engaging the brake-holding slide 4, regardless of the position of the latch-controlling lever 7.

Figure 2:
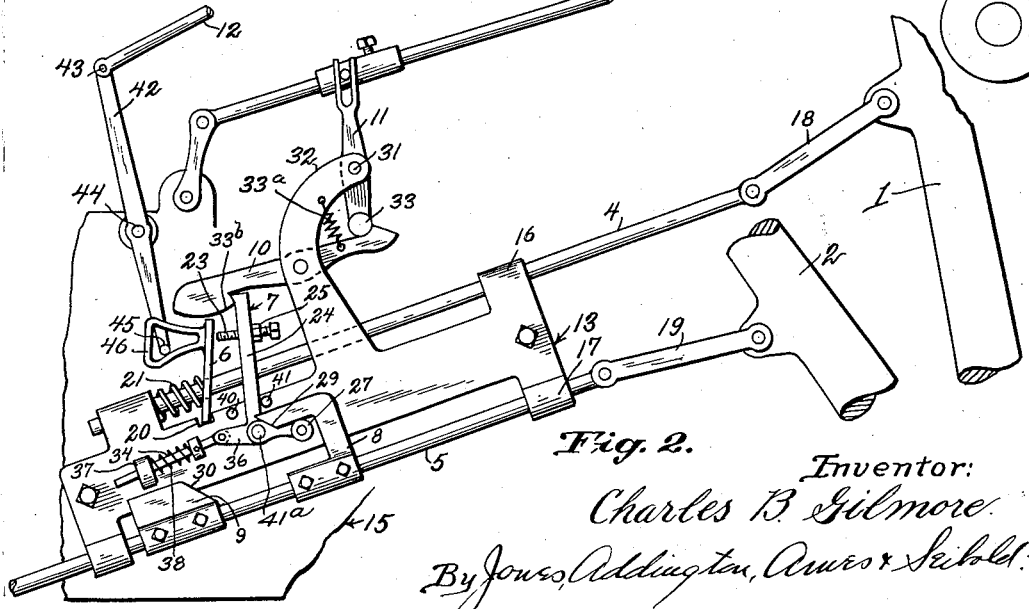
Fig. 2 is a view of the parts shown in Fig. 1 with the clutch pedal abnormally depressed to permit the brake holding means to become effective.
Figures 3, 5:
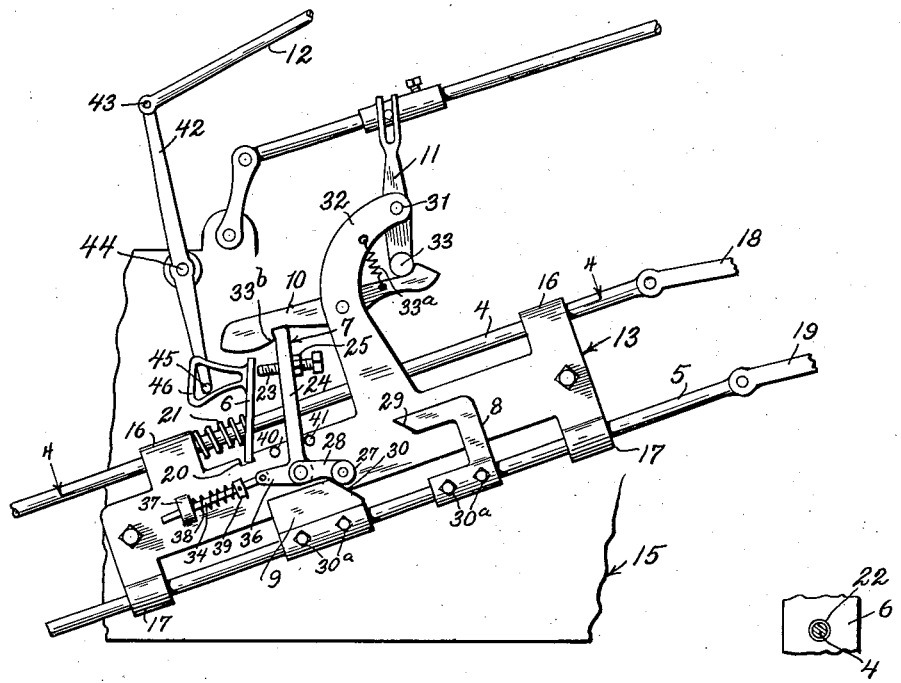
Fig. 3 is a view of the parts shown in Fig. 1 with the brake pedal depressed and held by the brake holding means and the foot pressure relieved from the clutch pedal but with the clutch pedal held in clutch disconnecting position automatically.
Fig. 5 is a section on the line 5—5 of Fig. 1.
Figure 4:
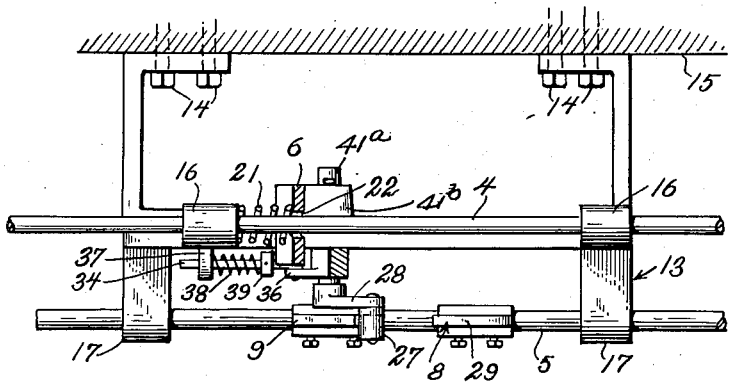
Fig. 4 is a section on the line 4—4 of Fig. 3.

The brake-holding slide 4, the cam-carrying and clutch-holding slide 5, the gripping member 6, the restraining lever 7, the latch 10, and the lever 11 may all be mounted on a supporting bracket 13 secured by means of screws or bolts 14 to any suitable stationary part 15 of the car, such as the engine block or some part of the chassis. The slides 4 and 5 are slidable in spaced bearings 16, 17 formed on this bracket. These slides 4 and 5 are connected with the pedals 1 and 2, respectively, by means of links 18 and 19. The gripping member 6 is pivotally mounted in a notch 20 formed in the bracket 13 and is pressed into gripping engagement with the rod 4 by means of a coil compression spring 21 which surrounds the rod 4, one end bearing against the guide 16 for the slide 4 and the other bearing against this gripping member 6. The gripping engagement with the slide 4 is effected by making this slide 4 pass through a hole 22 in the gripping member, the hole being somewhat larger in diameter than the slide 4 so that when the gripping member 6 is at right angles to the slide 4 it will exert no gripping effect, but will permit the slide to move freely in the hole. However, when the restraining lever 7 is moved away from the gripping member 6 as shown in Figs. 2 and 3 the edges of the hole in the gripping member will bind against the slide 4 and will hold the slide 4 in any position to which it may be depressed by the pedal 1. The gripping member will of course permit the slide 4 to move freely to the left as viewed in Figs. 2 and 3, but will resist any movement of the slide 4 to the right.

In order to secure just the right relation between the gripping member 6 and the restraining lever 7 the latch has mounted thereon an adjustable stop screw 23 threaded through the long arm 24 of the lever and held in adjusted position by means of a lock nut 25. The point of this screw engages the gripping member 6 when parts are in the position shown in Fig. 1 to hold the gripping member in inoperative condition with respect to the slide 4.

When the clutch pedal 2 is in clutch connecting position, as shown in Fig. 1, the cam 9 mounted on the slide 5 is in such a position as to hold the restraining lever 7 in a position to render the gripping member 6 inoperative to hold the slide 4. Furthermore, the upper surface 26 of this cam member 9 is of sufficient extent to permit the normal operation of the clutch without causing this upper surface to disengage the roller 27 on the short arm 28 of the bell crank restraining lever 7, so that the clutch can be connected and disconnected while still maintaining the gripping member 6 inoperative with respect to the slide 4. However, if the driver should desire to render the gripping member 6 operative to cooperate with the slide 4 to hold the brake in applied position, he can accomplish this by giving an abnormal movement to the clutch pedal 2 of sufficient extent to bring the upper arm 29 of the cam member 8 into engagement with the roller 27 on the short arm of the restraining lever 7 to cause the restraining lever 7 to be moved to the position shown in Fig. 2, in which position the screw 23 will be moved away from operative relation with respect to the gripping member 6 and will permit this gripping member 6 to hold the slide 4 in any position to which it may be depressed by the brake pedal 1; furthermore, it will be noted that the cam member 8 throws the restraining lever 7 far enough to permit the latch 10 to slip down over the upper end of the long arm 24 of the restraining lever 7 and hold this in the position shown in Fig. 2. This arrangement will enable the driver to release the clutch pedal 2 which will however still be held in clutch disconnecting position, as shown in Fig. 3 by the engagement of the sloping portion 30 of the cam 9 with the roller 27 on the short arm of the restraining lever 7. The restraining lever 7 which is held in the position shown in Fig. 3 by means of the latch 10 thus serves to hold the clutch pedal in clutch disconnecting position.

The cams 8 and 9 are adjustably mounted on the slide 5 and may be held in the proper adjusted position by means of set screws 30a.

The construction is such, however, that both the clutch controlling slide 5 and the brake controlling slide 4 will be released when the accelerator button 3 is depressed, to permit the brake to be released and the clutch to move to connecting position. This release of the slides is effected by means of the lever 11 pivoted at 31 to the bracket arm 32, the lower end 33 of which lever 11 engages with one arm of the latch 10, causing this latch 10 to release the restraining lever 7. A coil tension spring 33a is provided which tends to move the latch 10 from the position shown in Fig. 1 to the position shown in Fig. 2. As soon as the restraining lever 7 is released the return spring (not shown), which acts to restore the clutch pedal 2 to clutch connecting position, will cause the restraining lever to be restored to the position shown in Fig. 1 by the action of the sloping portion 30 of the cam 9 on the roller 27 on the short arm on the restraining lever 7. This moves the gripping member 6 to inoperative position with respect to the slide 4 whereupon the return spring for the brake pedal causes the brake to be released. From this it will be seen that simply depressing the accelerator button will cause the brake to be released and the clutch to become engaged. The latch 10 is provided with a cam surface 33b which cooperates with the upper end of the arm 24 in such a way that as the arm 24 moves from the position shown in Fig. 3 to the position shown in Fig. 1, it will move the lever 10 to a position in which it will clear the lower end 33 of the lever 11 so as not to cause any wear on the adjacent parts of the levers 10 and 11 as the accelerator is operated.

The construction above described is advantageous if the driver has to stop on a grade, hold the car therefor a while and then start up again. To accomplish this the driver will first give the clutch pedal 2 an abnormal movement sufficient to move the restraining member 7 to the latched position shown in Fig. 2. This disconnects the clutch and makes the gripping member 6 effective to cooperate with the brake holding slide 4. The driver will then press down on the brake pedal 1 far enough to apply the brakes with sufficient force to hold the car, and the gripping member 6 will hold the slide 4 in any position to which it may have been thus moved. The driver can then take both feet off the pedals 1 and 2, if desired and the parts will be held in the position shown in Fig. 3 in which the clutch is held in clutch disconnecting position and the brake is held applied. This will enable the driver to leave the gear shift in driving position if he desires, as the clutch is held out. When the driver desires to put the car in motion again he simply presses on the accelerator button 3 which will first speed up the engine, then release the brake, and then permit the clutch to move to engaging position.

In order to hold the roller on the restraining lever 7 out of contact with the cams 8 and 9 and thus prevent wear on these cams and the cooperating follower roller, I provide a spring construction which will hold the restraining lever in either of the extreme positions to which it may be moved. This spring construction comprises a link 34 pivotally connected at 35 to an arm 36 of the restraining lever and having its upper end slidable in and opening in a lug on the bracket 13, and a coil compression spring 38 surrounding this link 34 and bearing at one end against a collar 39 on the link and at its upper end against the lug. The construction is such that the pivotal connection 35 between the link and the lever moves past the dead-center in moving from the position shown in Fig. 1 to the position shown in Fig. 2 so that this spring will hold the restraining lever in either of its extreme positions, which extreme positions are determined by means of a pair of stop pins 40 and 41 secured to the bracket 13 and positioned on opposite sides of the long arm 24 of the restraining lever.

The arm 36 is formed integral with the arm 24. The arms 24 and 28 are both fixedly mounted on a rock shaft 41a rotatable in a bearing 41b in the bracket 13.

The construction by means of which the driver may when he desires render the gripping member 6 inoperative to hold the slide 4, comprises a lever 42 pivotally connected at 43 with the pull rod 12 and pivotally mounted at 44 on a suitable support, and having its lower end provided with a pin 45 which operates in a slot or opening 46 in the gripping member 6 thus having a lost motion connection therewith which permits the gripping member to act when the lever is in the full line position shown in Fig. 1. However, when the lever 42 is moved to the dotted line position shown in Fig. 1 the pin 45 on this lever is at the left-hand end of the opening 46 in the gripping member and the gripping member is thus held at right angles with respect to the slide 4 so that it cannot grip this slide.

In order to hold the pull rod 12 in the dotted line position shown in Fig. 1 when desired, this rod is provided with a notch which receives the edge of a retaining plate, the rod and plate being held in engaged position by means of a leaf spring which bears down on the pull rod.

It will be noted that this construction lessens the probability of stalling the engine by engaging the clutch before the engine has been speeded up sufficiently, as the clutch is not allowed to engage until the accelerator button has been depressed and the brake released. It will also be noted that the construction enables the car to be held on an incline without the necessity for the driver to press down on either the brake pedal or the clutch pedal. After these pedals have been depressed they are automatically held until the driver is ready to start up again and presses the accelerator button.

While I have described but one embodiment of my invention, it is obvious that many modifications therein may occur to those skilled in the art and I desire, therefore, that my invention be limited only by the scope of the appended claims and by the prior art.

I claim:

1. Control mechanism for automobiles comprising means for applying the brake, means for connecting and disconnecting the clutch, normally inoperative means for holding the brake applied, means whereby movement of said clutch controlling means when in clutch disconnecting position renders said holding means operative, and means whereby said clutch controlling means is held in clutch disconnecting position so long as said brake holding means is holding the brake applied.

2. Control mechanism for automobiles comprising means for applying the brake, means for connecting and disconnecting the clutch, normally inoperative means for holding the brake applied, means whereby movement of said clutch controlling means when in clutch disconnecting position renders said holding means operative, accelerator means, and means controlled by said accelerator means for releasing said brake holding means and clutch holding means.

3. Control mechanism for automobiles comprising means for applying the brake, means for connecting and disconnecting the clutch, accelerator means, normally inoperative means for holding said brake applied, means whereby movement of said clutch controlling means when in clutch disconnecting position renders said holding means operative, and means controlled by said accelerator for releasing said brake holding means.

4. Control mechanism for automobiles comprising means for applying the brake, means for connecting and disconnecting the clutch, normally inoperative means for holding the brake applied, means whereby movement of said clutch controlling means when in clutch disconnecting position renders said holding means operative, accelerator means, means controlled by said accelerator means for releasing said brake holding means, and manually operable means for causing said accelerator means and clutch controlling means to be inoperative to control said brake holding means.

5. Control mechanism for automobiles comprising means for applying the brake, means for connecting and disconnecting the clutch, means controlled by said clutch controlling means for holding the brake applied, and manually operable means for causing said clutch controlling means to be inoperative to control said brake holding means.

6. Control mechanism for automobiles comprising means for applying the brake, means for connecting and disconnecting the clutch, and means controlled by said clutch controlling means for holding the brake applied, said means comprising a retaining device for the brake, means for normally restraining said retaining device in inoperative position, and means whereby movement of said clutch controlling means when in clutch disconnecting position operates said restraining means to cause the brake retaining device to become operative, said last means comprising a member having a lost motion relation with respect to said restraining means whereby the clutch may be disconnected before the restraining means are operated.

7. Control mechanism for automobiles comprising means for applying the brake, means for connecting and disconnecting the clutch, and means controlled by said clutch controlling means for holding the brake applied, said means comprising a retaining device for the brake, means for normally restraining said retaining device in inoperative position, and means whereby movement of said clutch controlling means when in clutch disconnecting position operates said restraining means to cause the brake retaining device to become operative, and means whereby said clutch controlling means is held in clutch disconnecting position so long as said brake holding means is holding the brake applied.

8. Control mechanism for automobiles comprising means for applying the brake, means for connecting and disconnecting the clutch, and means controlled by said clutch controlling means for holding the brake applied, said means comprising a retaining device for the brake, means for normally restraining said retaining device in inoperative position, and means whereby movement of said clutch controlling means when in clutch disconnecting position operates said restraining means to cause the brake retaining device to become operative, and means whereby said clutch controlling means is held in clutch disconnecting position so long as said brake holding means is holding the brake applied, said last means comprising a retaining member for holding the clutch controlling means in disconnecting position controlled by said restraining means.

9. Control mechanism for automobiles comprising means for applying the brake, means for connecting and disconnecting the clutch, and means controlled by said clutch controlling means for holding the brake applied, said means comprising a retaining device for the brake, means for normally restraining said retaining device in inoperative position, and means whereby movement of said clutch controlling means when in clutch disconnecting position operates said restraining means to cause the brake retaining device to become operative, a latch for holding said restraining means in non-restraining condition, accelerator means, and means controlled by said accelerator means for releasing said latch.

10. Control mechanism for motor vehicles comprising means for applying the brake, means for holding the brake applied, means whereby said brake holding means may be rendered inoperative, and manually operable means for causing said brake holding means to become operative.

11. An automobile controlling construction comprising brake applying means movable to different positions to cause different degrees of braking effect, means for retaining said brake applying member in any of said different positions to which it may be moved, a motor speed control member movable to different positions to cause different motor speeds and means whereby movement of said speed controlling member to increase the speed of the motor causes said retaining means to release said brake applying means to enable the brake applying means to move to non-braking position.

12. An automobile controlling construction comprising brake applying means movable to different positions to cause different degrees of braking effect, latch means for retaining said brake applying member in any of said different positions to which it may be moved, a motor speed control member movable to different positions to cause different motor speeds, and means whereby the movement of said speed controlling member to increase the speed of the motor causes said retaining means to release said brake applying means to enable the brake applying means to move to non-braking position.

13. An automobile controlling construction comprising brake applying means movable to different positions to cause different degrees of braking effect, means for retaining said brake applying member in any of said different positions to which it may be moved, a motor speed control member movable to different positions to cause different motor speeds, means for connecting and disconnecting the clutch, means for holding the clutch controlling means in disconnecting position and means whereby movement of said speed controlling member to increase the speed of the motor causes said clutch holding means to release the clutch to enable it to move to connecting position and causes said retaining means to release said brake applying means to enable it to move to non-braking position.

14. An automobile controlling construction comprising brake applying means movable to different positions to cause different degrees of braking effect, latch means for retaining said brake applying member in any of said different positions to which it may be moved, a motor speed control member movable to different positions to cause different motor speeds, means for connecting and disconnecting the clutch, means for holding the clutch controlling means in disconnecting position, and means whereby movement of said speed controlling member to increase the speed of the motor causes said clutch holding means to release the clutch to enable it to move to connecting position and causes said retaining means to release said brake applying means to enable it to move to non-braking position.

C. B. GILMORE.